United States Patent [19]
Heston

[11] Patent Number: 5,984,620
[45] Date of Patent: Nov. 16, 1999

[54] PICK AND PLACE PALLETIZING DEVICE

[76] Inventor: Stephen L. Heston, 1324 Jay Ct., West Linn, Oreg. 97068

[21] Appl. No.: 09/059,075

[22] Filed: Apr. 9, 1998

[51] Int. Cl.[6] .................................................. B65G 57/02
[52] U.S. Cl. ..................................... 414/791.6; 414/793.4; 414/793.5
[58] Field of Search .............................. 414/791.6, 792.6, 414/792.8, 793.4, 793.5, 793.6, 799; 198/468.6, 468.8

[56] References Cited

U.S. PATENT DOCUMENTS

| | | | |
|---|---|---|---|
| 2,815,870 | 12/1957 | Laub, III | 414/793.5 |
| 2,841,433 | 7/1958 | Pagdin et al. | 414/792.8 |
| 2,875,908 | 3/1959 | Woodcock | 414/793.5 |
| 3,471,038 | 10/1969 | Verrinder | 414/793.5 |
| 3,782,564 | 1/1974 | Burt . | |
| 3,836,018 | 9/1974 | Dawson et al. . | |
| 4,055,257 | 10/1977 | Krebs | 414/793.5 |
| 4,214,848 | 7/1980 | Verwey et al. | 414/791.6 |

OTHER PUBLICATIONS

Live Tubular Roller Chain, Specification sheet, 1 page Available from U.S. Tsubaki.
Mathews Palletizer, WR Series Palletizers with wrap-around apron, Brochure, 3 pages.

Primary Examiner—Christopher P. Ellis
Assistant Examiner—Gregory A. Morse
Attorney, Agent, or Firm—Keith A. Cushing

[57] ABSTRACT

A pick and place device includes a lift head and a build platform. Both the lift head and the build platform include flexible aprons. An item layer is constructed on the build platform and the lift head is moved into position over the build platform. By slipping the lift head apron under the layer while concurrently pulling from under the layer the build platform apron, support for the layer passes from the build platform to the lift head. The lift head then moves to a place site and the lift head apron is pulled from under the layer and the layer falls from the lift head onto the place site. Under one form of the device, the layer may be constructed directly upon the lift head apron and then moved to a place site and deposited thereat by pulling the lift head apron from thereunder.

24 Claims, 10 Drawing Sheets

PICK AND PLACE PALLETIZING DEVICE

BACKGROUND OF THE INVENTION

The present invention relates generally to article manipulation, and particularly to manipulation of entire layers of items during palletizing operations.

A pallet is a standard support and carrier structure used in shipping. Pallets provide a support surface receiving items stacked for transport. Pallets include a space below the support surface receiving, for example, the tines of a forklift whereby the forklift lifts and moves the pallet with a stack of items thereon. Typically, items are boxes organized in layers upon the pallet. Efficient shipping of palletized items calls for efficient stacking of items on the pallet to minimize open space within the stack. Furthermore, by varying the orientation and/or pattern of items from layer to layer, a stable stack of items may be constructed upon a pallet. Accordingly, a variety of "box patterns" have emerged for efficient and stable packing together of items in item layers on a pallet. The standard pallet is used widely throughout the shipping industry and a variety of apparatus have evolved in relation to the standard pallet for stacking items upon pallets, i.e., for palletizing.

Thus, palletizing, as used herein, generally refers to a process of constructing a stack of items organized as layers on a pallet. The term palletizing as used herein, however, shall not be limited to stacking relative to a pallet, but shall include generally any stacking process relative to articles organized as stacked layers.

A common arrangement for palletizing uses a rigid planar "apron" to lift from below a layer of items. A layer might be built upon an apron or the apron might be positioned under the layer by sliding the apron between the layer and a supporting surface therebelow. Once positioned below a layer of items, the apron moves and places the item layer elsewhere, e.g., moves the item layer over a pallet or the top layer of a stack of item layers on a pallet. The palletizing device then blocks the layer against movement while the apron slides out from underneath the layer. In this manner, the apron moves and places an entire layer of items upon a pallet or upon the top layer of items on a pallet. Generally, an apron performs only palletizing operations because of the difficulty of inserting an apron between layers of an existing stack of items on a pallet. Unfortunately, use of such a rigid planar apron requires significant space adjacent the pallet stack to accommodate the apron as it is pulled from under the item layer.

One known prior palletizing device, available from the Matthews Conveyor Division, uses a "wrap-around apron" including a set of rollers positioned above a pallet. An item layer is constructed on the rollers and the pallet including any layers stacked thereon moves upward to a point just below the rollers. The item layer is then blocked against movement and the rollers are pulled out from underneath the item layer resting thereon. The item layer thereby drops onto the pallet or stack of item layers resting on the pallet. Unfortunately, this arrangement requires manipulation of the entire pallet and stack of item layers resting on the pallet to position the upper portion thereof just below the rollers and allow a new item layer to come to rest thereon as the rollers are pulled out from thereunder. Accordingly, the rollers follow a path out from underneath the new layer and then down, around, and underneath the entire pallet and stack of items resting thereon. This device is referred to as a "WR Series Palletizer."

U.S. Pat. No. 3,782,564 entitled Product Picking Stacker Crane System, filed Sep. 27, 1971 by Harold S. Burt, shows an overhead crane system transferring item layers from one stack to an adjacent stack. The system is a dual actuator system requiring separate vertical movement actuators and horizontal movement actuators operating in coordination.

U.S. Pat. No. 3,836,018 entitle Discrete Article Palletizing and De-Palletizing apparatus, filed Nov. 5, 1973 by George J. Dawson, et al shows a palletizing device including a top-picking engagement mechanism and a dual actuation drive system, i.e., a horizontal actuation system and a separate vertical actuation system. The illustrated apparatus moves item layers between a first station and a second station.

Thus, article manipulation in the context of palletizing generally requires relatively complex apparatus and associated complex control schemes. Devices using multiple actuators, e.g., gantry systems with x-y positioning of a load, result in relatively complex and expensive apparatus. Because such systems include separate actuation devices operating in different dimensions, e.g., separate devices for movement in an x dimension and a y dimension, such systems can cause abrupt transition in vertical or horizontal movement and thereby risk loss of a load. To avoid such abrupt transition in movement, elaborate coordination and control must be imposed upon the separate actuation devices to accomplish smooth transition in vertical and horizontal movement.

Thus, it would be desirable to provide a palletizing apparatus having a simplified structural architecture and a simplified control scheme for reduced overall cost and reduced overall complexity with a smooth transition in movement of loads.

SUMMARY OF THE INVENTION

A pick and place device under the present invention moves a layer of items from a pick site to a place site. The pick and place device includes a pick site receiving the item layer at a support platform. The support platform includes a first apron, the apron being moveable and flexible relative to at least one dimension thereof. A lift head moves between the pick site and the place site. The lift head includes a second apron, also moveable and flexible relative to at least one dimension thereof. The second apron has a first position which closes a downward-facing opening of the lift head. In its second position, the second apron is located to open the downward-facing opening of the lift head. A control operates to selectively move the lift head between the pick site and the place site. The control moves the second apron to its second position, thereby opening the downward-facing opening of the lift head, and lowers the lift head to bring at least a portion of the first apron and the second apron in substantially co-planar relation. The control then further moves the first apron and second apron concurrently to slip the first apron out from under the layer while slipping the second apron under the layer. In this manner, the layer passes from the first apron to the second apron. The lift head may then be moved to the place site and the second apron pulled out from underneath the layer to drop the layer at the place site.

According to a second aspect of the present invention, a lift head moves an item from a pick site to a place site and includes a structure defining a downward-facing opening and a laterally-facing opening. An apron, flexible and moveable in at least one dimension thereof, has a first position closing the downward-facing opening and providing an item layer support platform. The laterally-facing opening is open at least when the downward-facing opening is closed by the apron. The lift head includes a stop element. A control operates to move the apron to its first position, move an item layer upon the apron by passage through the laterally-facing opening, move the lift head from the pick site to the place site, and move the apron out of its first position to urge the item layer against the stop element and further to open the downward-facing opening thereby allowing the layer to drop from the lift head through the downward-facing opening and onto the place site.

The subject matter of the present invention is particularly pointed out and distinctly claimed in the concluding portion of this specification. However, both the organization and method of operation of the invention, together with further advantages and objects thereof, may best be understood by reference to the following description taken with the accompanying drawings wherein like reference characters refer to like elements.

BRIEF DESCRIPTION OF THE DRAWINGS

For a better understanding of the invention, and to show how the same may be carried into effect, reference will now be made, by way of example, to the accompanying drawings in which.

DETAILED DESCRIPTION OF THE PREFERRED EMBODIMENT

Figure 1:
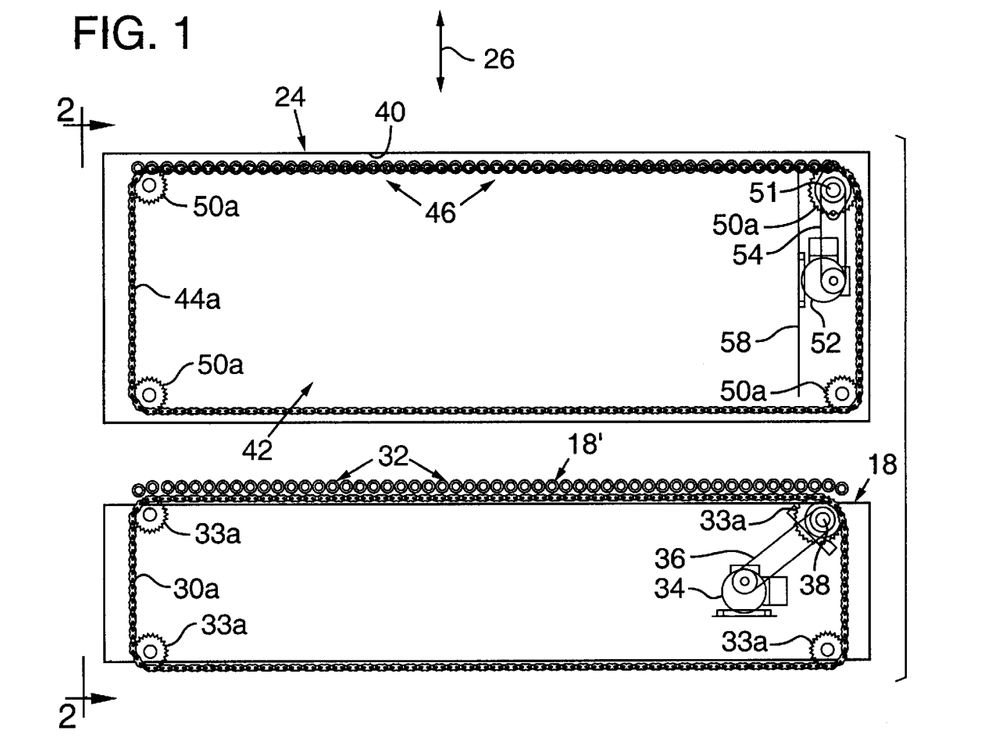
FIG. 1 illustrates a lift head and a layer build platform according to a preferred embodiment of the present invention.
Figure 2:
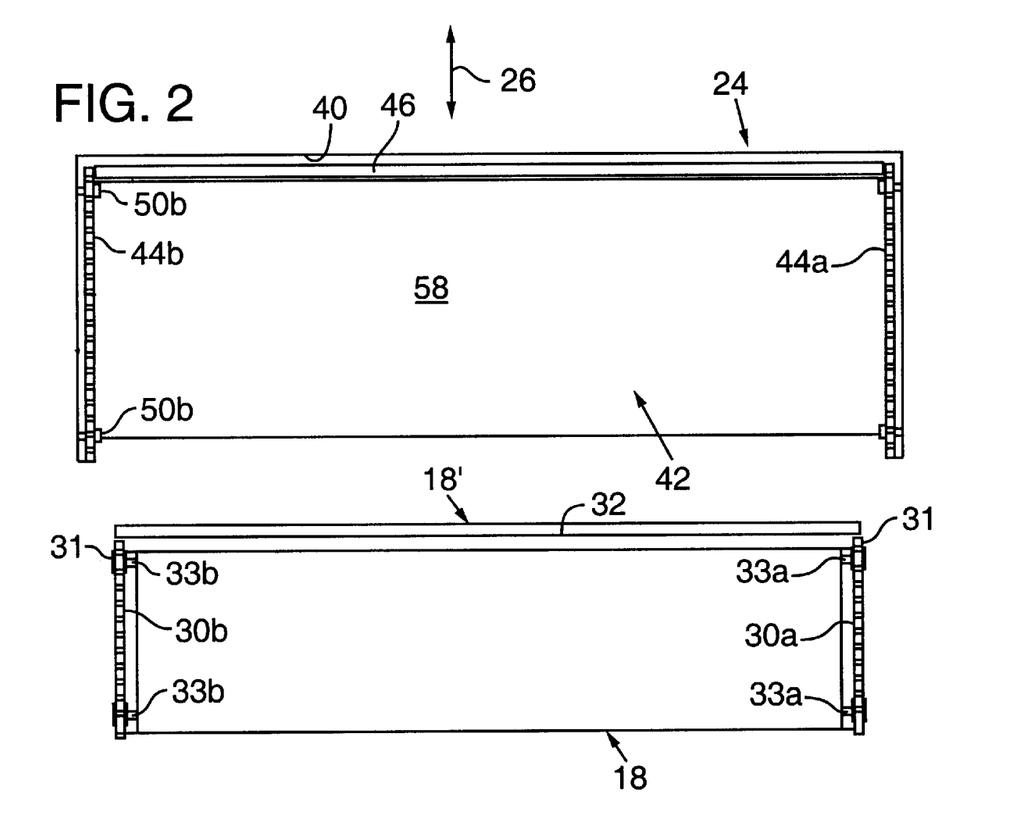
FIG. 2 illustrates the lift head and layer build platform of FIG. 1 as viewed along lines 2—2 of FIG. 1.

FIG. 1 illustrates schematically a layer build platform 18 and a lift head 24. FIG. 2 illustrates schematically an end view of build platform 18 and lift head 24 as seen along lines 2—2 of FIG. 1. As will be discussed more fully hereafter, build platform 18 receives a layer of items, e.g., boxes, to be stacked on a pallet. Lift head 24 picks an entire item layer from build platform 18 and places the item layer upon a pallet or upon a stack of item layers on a pallet. Lift head 24 is moveable relative to build platform 18 as indicated at reference numeral 26.

With reference to FIGS. 1 and 2, build platform 18 includes a chain loop 30a and a chain loop 30b in face-to-face relation. A set of roller tubes 32 interconnect corresponding portions, i.e., a sequence of consecutive links, of chain loops 30a and 30b. Thus, the set of roller tubes 32 provide a flexible support platform which may be moved by synchronized movement of chains 30a and 30b. More particularly, when positioned as illustrated in FIGS. 1 and 2, roller tubes 32 provide an upward-facing item layer support site 18'. A set of sprockets 33a and 33b support chains 30a and 30b, respectively, each in a generally rectangular loop formation. A drive motor 34 couples via drive chain 36 to a drive shaft 38. Drive motor 34 thereby moves chains 30a and 30b in unison.

Thus, the set of roller tubes 32 interconnecting chains 30a and 30b as positioned across the upper portion of build platform 18 establish support site 18' whereat a layer of items may be positioned and organized in preparation for engagement by lift head 24 as described more fully hereafter.

Lift head 24 defines an enclosure 40 including a downward-facing opening 42. Lift head 24 also includes a chain loop 44a and a chain loop 44b in face-to-face relation. A set of roller tubes 46 interconnect corresponding portions, i.e., a sequence of consecutive links, of chains 44a and 44b. Thus, roller tubes 46 establish a support platform which may be moved by synchronized movement of chains 44a and 44b.

A set of sprockets 50a support chain loop 44a and set of sprockets 50b support chain loop 44b. A drive motor 52 couples via drive chain 54 to a drive shaft 51 carrying one of sprockets 50a and one of sprockets 50b. In this manner, operation of drive motor 52 moves chain loops 44a and 44b in unison.

As positioned in FIGS. 1 and 2, chain loops 44a and 44b to locate roller tubes 46 at an upper portion of enclosure 40. As a result, the lower downward-facing opening 42 of enclosure 40 is open. In such position, lift head 24 lowers over an item layer, thereby positioning the item layer within enclosure 40. As described more fully hereafter, drive motor 52 then moves roller tubes 46 to occupy the downward-facing opening 42 and thereby engage and support from below an item layer for movement away from support site 18'.

The set of roller tubes 32 and set of roller tubes 46 each provide a flexible support apron supporting an item layer 60, but flexible at least in the dimension of travel to allow the support apron to travel under or out from under a layer 60 without requiring substantial adjacent space as is required in the case of rigid aprons.

Figure 3A:
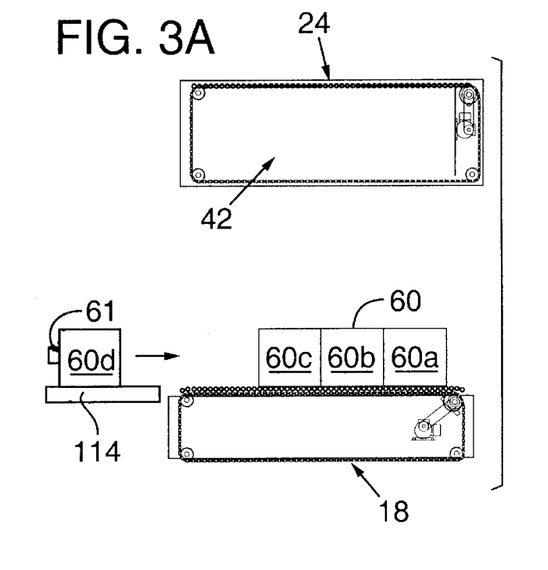
FIGS. 3A–3D illustrate operation and interaction between the lift head and layer build platform of FIGS. 1 and 2 in transferring an item layer from the build platform to the lift head according to a preferred embodiment of the present invention.

FIGS. 3A–3D illustrate use of lift head 24 to pick an item layer 60 from build platform 18. In FIG. 3A, an item layer 60 has been positioned on site 18'. For example, a push bar 61 moves rows of boxes, individually rows 60a–60d, onto site 18'. FIG. 3A illustrates the last row 60d of boxes being pushed onto site 18' of build platform 18'. Item layer 60 construction occurs in conventional fashion whereby push bar 61 engages a row of boxes on a conveyor 114 and pushes the row into position on site 18' within an item layer 60. Thus, conveyor 114 delivers a series of boxes and push bar 61 pushes the leading set of boxes as a layer row onto site 18' in conventional fashion until a complete item layer 60 has been fully constructed at site 18'. While shown above build platform 18 in FIG. 3A, it will be understood that lift head 24 may be off doing other tasks, i.e., delivering a previous item layer 60 to a pallet stack, thereby facilitating continuous layer 60 building at site 18' and concurrent stacking of item layers 60.

Figure 3B:
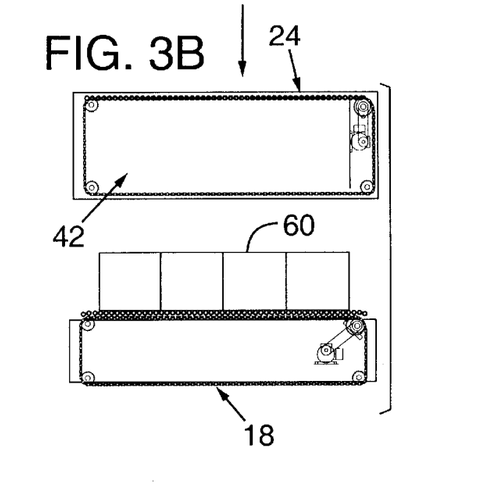

FIG. 3B illustrates a completed item layer 60 resting on site 18'. Lift head 24 moves down toward item layer 60. With roller tubes 46 positioned as illustrated at an upper portion of enclosure 40, downward-facing opening 42 is clear, i.e., open, and lift head 24 encloses item layer 60 as shown in FIG. 3C.

Figure 3C:
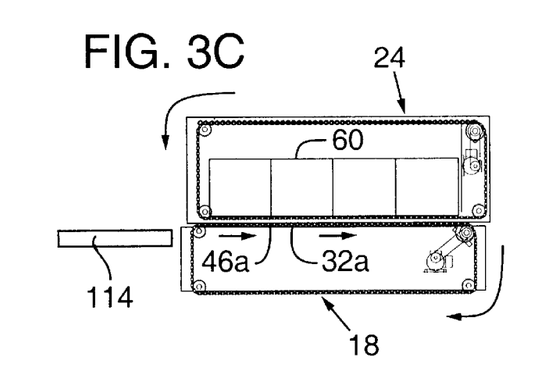
Figure 3D:
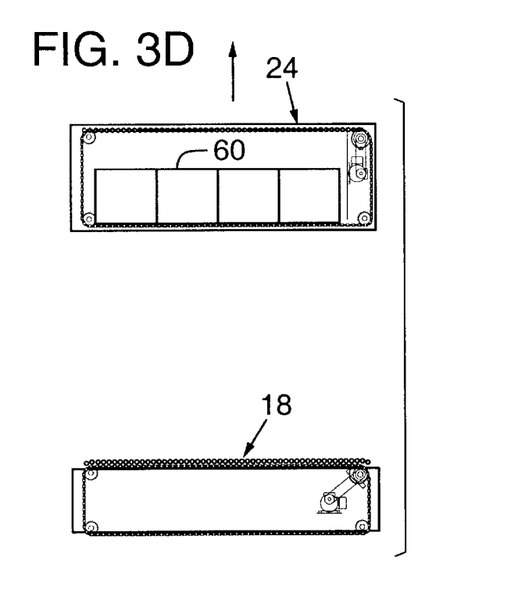

In FIG. 3C, by coordinated actuation of drive motors 34 and 52 and coordinated positioning of roller tubes 32 and 46, layer 60 passes from build platform 18 to lift head 24. Once lift head 24 receives therein an item layer 60 through the downward-facing opening 42, drive motor 34 moves layer 60 rightward (in the view of FIG. 3C) until layer 60 engages stop plate 58 of lift head 24. As the set of roller tubes 32 of build platform 18 move from underneath layer 60, the set of roller tubes 46 of lift head 24 follow and move under layer 60 to then carry layer 60. More particularly, as a trailing roller tube 32a first passes under item layer 60 a leading roller tube 46a follows immediately thereafter and assumes support for item layer 60. Eventually, support for item layer 60 passes from roller tubes 32 to roller tubes 46. As viewed in FIG. 3C, chain loops 44a and 44b move counter clockwise while chain loops 30a and 30b move clockwise. In this manner, build platform 18 passes layer 60 to lift head 24. Once roller tubes 32 move from under layer 60 and roller tubes 46 move fully under layer 60, lift head 24 moves vertically upward as illustrated in FIG. 3D. Lift head 24 thereafter moves over a pallet or a stack of layers on a pallet. Chain loops 44a and 44b then move further counter clockwise and layer 60 bears against stop plate 58. Eventually, downward-facing opening 42 opens and releases, i.e., drops, layer 60 onto a surface therebelow, e.g., onto a pallet or onto a stack of item layers 60 on a pallet.

While described as being co-planar, it will be understood that the portion of roller tubes 32 and 46 supporting a layer 60 during transfer need only be substantially co-planar, i.e., close enough to accomplish transfer. In some applications, it may be advantageous to locate roller tubes 46 slightly below roller tubes 32 to avoid potential jamming during the transfer. The allowed variation from an actual co-planar relationship will be a function of the particular items comprising layers 60 and degree of handling care required.

The relative length of roller tubes 32 and 46 support exchange at an item layer 60 from build platform 18 to lift head 24. In particular, roller tubes 32 are shorter than roller tubes 46 and allow the-support surface defined by roller tubes 32 to occupy the same plane as the support surface defined by roller tubes 46. Thus, when build platform 18 "hands" a layer 60 to lift head 24, the support surfaces defined by roller tubes 32 and roller tubes 46 are coplanar and a smooth "hand off" from build platform 18 to lift head 24 occurs.

Figure 4:
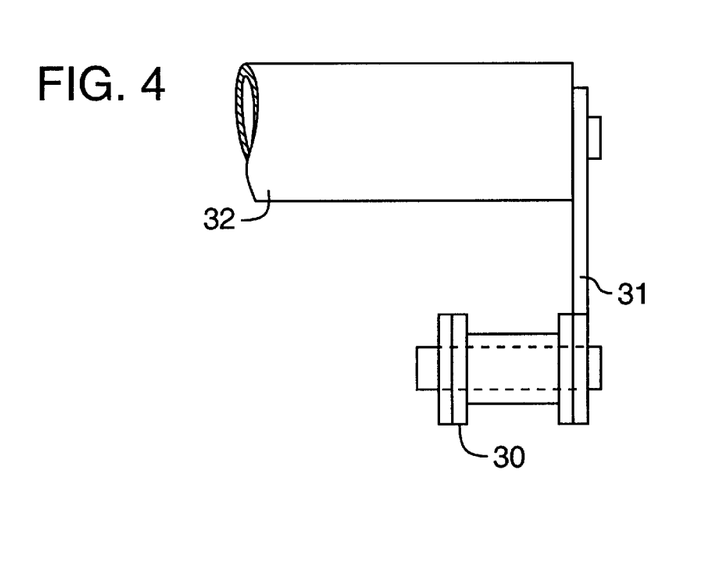
FIG. 4 illustrates in more detail a portion of the build platform of FIGS. 1 and 2.

FIG. 4 illustrates in more detail a mounting arrangement for roller tubes 32 relative to chains 30. More particularly, an offset or extension 31 couples each roller tube 32 to the corresponding link of chain 30. Extension 31, in conjunction with the more narrow length of roller tubes 32 relative to roller tubes 46, allows roller tubes 32 to occupy the same plane as roller tubes 46 when passing a layer 60 from build platform 18 to lift head 24 as illustrated in FIG. 3C.

Figure 5:
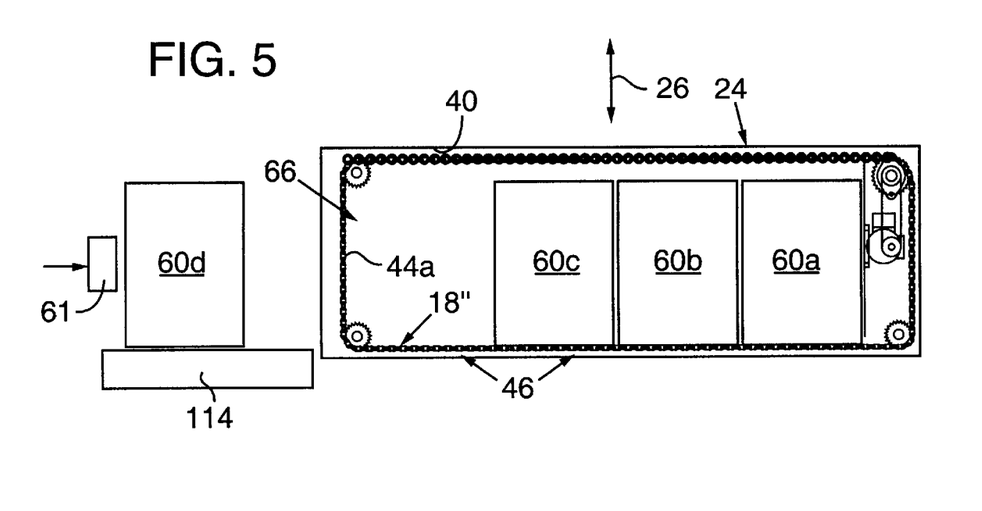
FIG. 5 illustrates an alternative method of loading an item layer onto the lift head of FIGS. 1 and 2 without requiring use of the build platform.

FIG. 5 illustrates an alternative method of loading a layer 60 upon lift head 24. In this particular arrangement, build platform 18 is eliminated. Lift head 24 receives a layer 60 by locating lift head 24 adjacent a layer building apparatus, e.g., conveyor 114 delivering a sequence of boxes. Drive motor 52 moves roller tubes 46 to a lower position, thereby defining a layer building site 18" within enclosure 40. Enclosure 40 includes an open leftward (as viewed in FIG. 5) end or opening 66. Rows of boxes, individually rows 60a–60d, are then pushed by bar 61 into enclosure 40 and onto site 18". Once a layer 60 has been pushed, row-by-row, onto site 18', lift head 24 moves to a drop site, i.e., to deliver the layer 60 upon a pallet or upon a stack of layers resting upon a pallet. As described earlier, to disengage a layer 60, lift head 24 activates drive motor 52 to move chains 44 counter clockwise (as viewed in FIG. 5) thereby pushing layer 60 against stop 58. Eventually all of roller tubes 46 move out from underneath layer 60. As a result, layer 60 drops onto the desired drop site, i.e., drops onto a pallet or onto a stack of layers upon a pallet. Because lift head 24 is vertically moveable, lift head 24 may be adjusted in position to gently drop a layer 60, i.e., let it fall approximately one inch, as it releases from lift head 24 and comes to rest upon a drop site therebelow.

Thus, build platform 18 allows concurrent construction of layers 60 while lift head 24 moves a previous layer 60 into position on a pallet or pallet stack. The particular arrangement illustrated in FIG. 5, however, does not allow concurrent construction of layers 60 and therefore operates at a relatively slower speed.

End plate 58 performs an important registration function. As a layer 60 pushes against end plate 58 it assumes a registration position coordinated with the position of a pallet whereby item layers 60 stack in coordinated and uniform relative position upon a pallet.

The roller tubes and chains of build platform 18 and lift head 24 may be provided by what is known as a "live tubular roller chain" as available from U.S. Tsubaki, Inc. under model No. TP 329-CP-44. Preferably, roller tubes 32 and 46 are of small dimension, e.g., ¾ inch diameter, and close lateral spacing, e.g., one inch spacing, to provide adequate support for item layers 60. While not required under the present invention, chains 30a and 30b could be incrementally advanced when loading an item layer 60 row-by-row onto site 18'. Roller tubes 32 and 46 offer little resistance when moving relative to an item layer 60 or when pushing rows of boxes onto a support surface defined thereby. Alternative structures include bars or slats spanning chains 30a and 30b and chains 44a and 44b in place of roller tubes 32 and 46, respectively.

While build platform 18 and lift head 24 have been described as including "chains" 30 and 44, it will be understood that a variety of alternative mechanisms may be employed. For example, cables, cogged timing belts, guide tracks, and the like may be employed to move structures, e.g., roller tubes, as described above in implementation of the build platform 18 and lift head 24.

FIGS. 6–9 illustrate a palletizer system 110 making use of the lift head 24 and build platform 18 of FIGS. 1 and 2. System 110 palletizes, i.e., builds a stack of item layers 60 layer-by-layer upon a pallet. For purposes of clarity and simplicity, however, lift head 24 and build platform 18 will be shown schematically in system 110 as simple box-form structures. It will be apparent from the preceding discussion, however, that lift head 24 and build platform 18 may be integrated into system 110 and operate in a fashion as described above.

Figure 6:
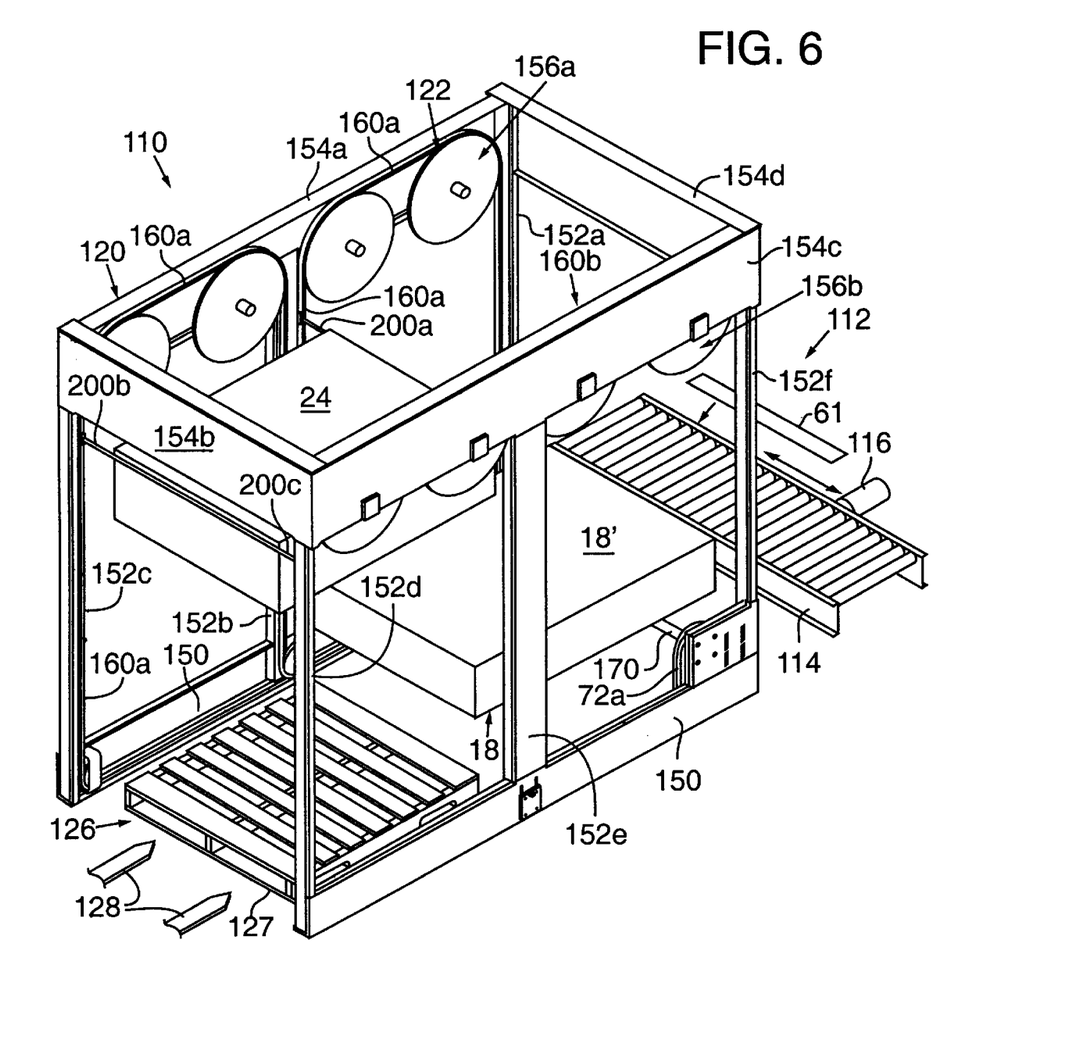
FIG. 6 illustrates in perspective a palletizer system making use of the lift head and build platform of FIGS. 1 and 2.

An item transport system 112 includes an item transport 114 driven by a reversible transport drive motor 116 and push bar 61. Item transport 114 interfaces with build platform 18 and push bar 61 (shown partially) to deliver item rows to site 18' and thereby constructs item layers 60 at site 18'. More particularly, transport 114 advances a sequence of boxes into position adjacent build platform 18 and push bar 61 engages a leading set of boxes as a layer row and pushes this row into position on site 18'. Transport 114 then advances a next set of boxes into position for engagement by push bar 61. Eventually, a complete item layer 60 is positioned at site 18'.

A pallet carrier 128, e.g., fork lift, moves pallets 127, into and out of pallet site 126. Pallets 127 are brought in empty and removed loaded during a palletizing operation as described herein. Pallet site 126, e.g., floor space, establishes an appropriate location for deposit of item layers 60 relative to a stack of item layers resting on a pallet 127 at site 126. As may be appreciated, each pallet 127 accommodates entry of carrier 128, i.e., the tines of a fork lift, whereby a pallet 127 may be moved onto or out of site 126 as necessary according to an ongoing palletizing operation.

As viewed in FIG. 6, transport system 112 occupies a rightward side of system 110 and pallet carrier 128 operates relative to a leftward side of system 110. As used herein, the terms "rightward" and "leftward" and the like shall be with reference to the rightward and leftward sides of system 110 as viewed in FIG. 6. During palletization, system 110 moves item layers 60 leftward.

A frame structure 120 supports therein build platform 18 and also supports a fixed-path actuation system 122. As discussed more fully hereafter, actuation system 122 operates in a single dimension, i.e., moves a lift head 24 carrying an item layer 60 along a fixed path whereby a single scalar value represents the position of an item layer 60 along this fixed path. More particularly, actuation system 122 carries lift head 24 along a fixed path between site 18' and pallet support site 126.

Frame structure 120 includes a base 150 and a set of vertical uprights 152a–152f each extending upward from base 150. A set of horizontal beams 154a–154d couple together upper ends of the vertical uprights 152 and a simple generally box-form frame structure results. More particularly, uprights 152a and 152f occupy a rightward position, uprights 152c and 152d occupy a leftward position, and uprights 152b and 152e occupy a mid-position intermediate the leftward and rightward sides of system 110. Beam 154a couples uprights 152a, 152b, and 152c. Beam 154b couples uprights 152c and 152d. Beam 154c couples uprights 152d, 152e, and 152f. Beam 154d couples uprights 152f and 152a.

Figure 7:
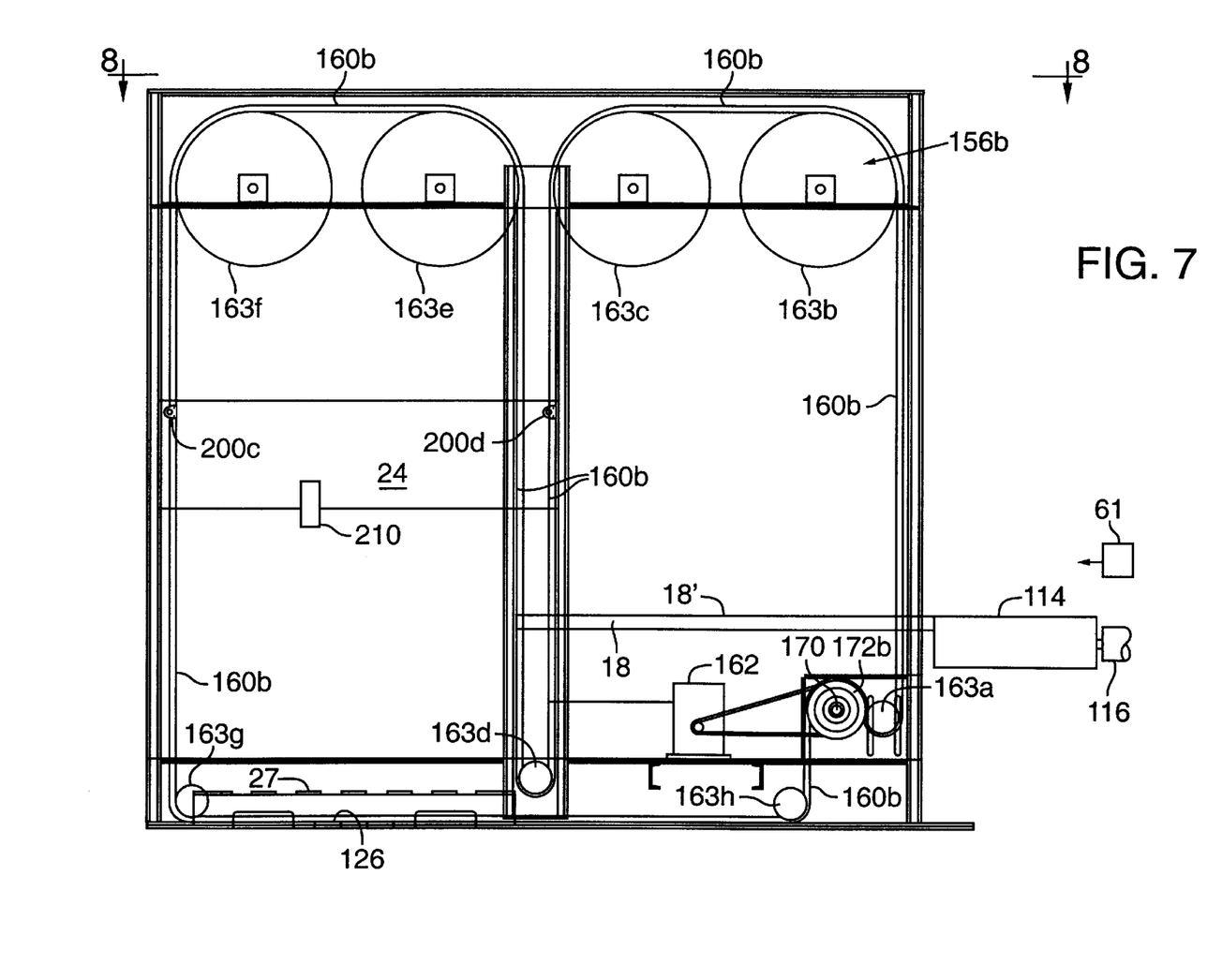
FIG. 7 illustrates a side view of the palletizing system of FIG. 6.
Figure 8:
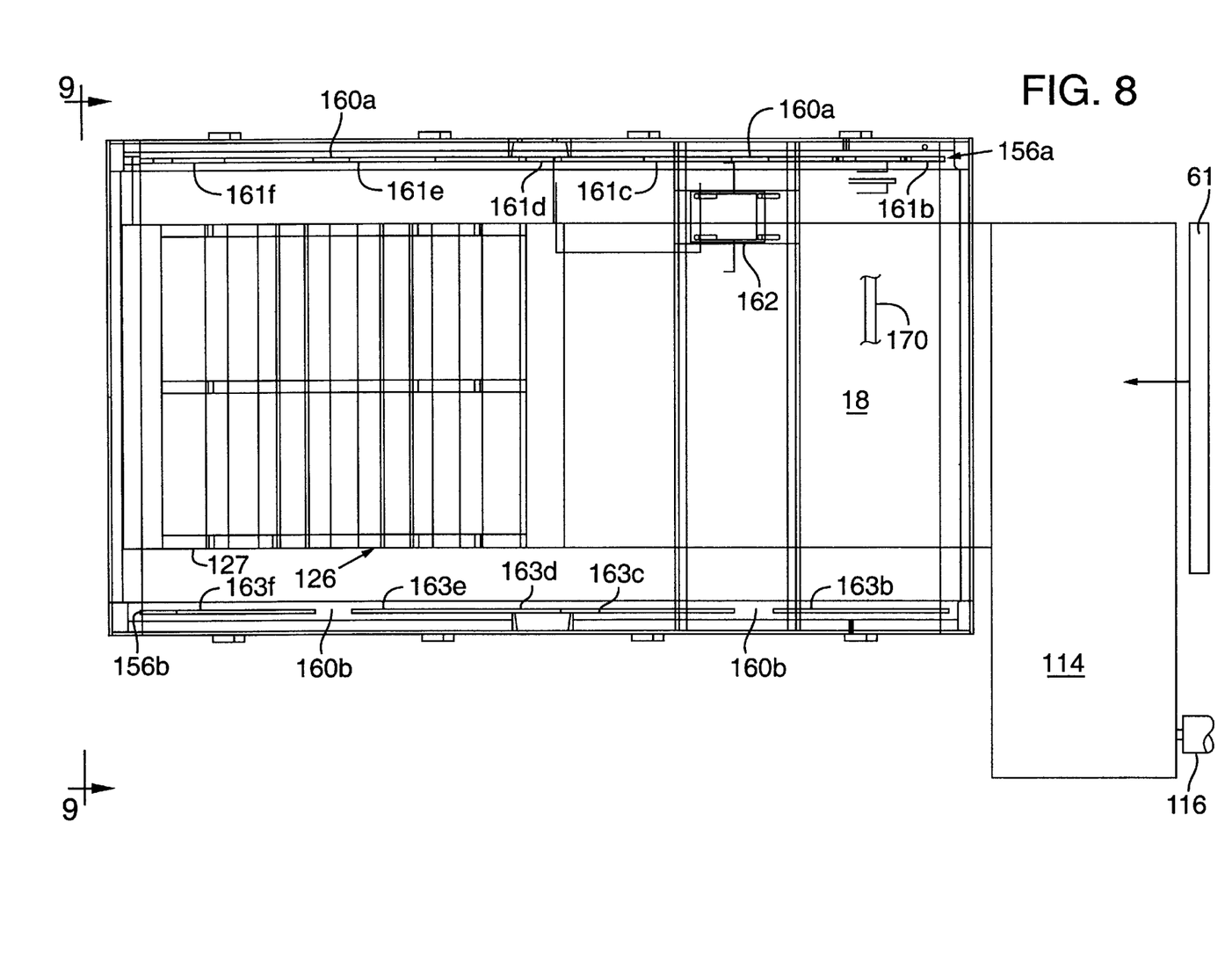
FIG. 8 is a top view of the palletizing system of FIG. 6 as taken along lines 8—8 of FIG. 7.
Figure 9:
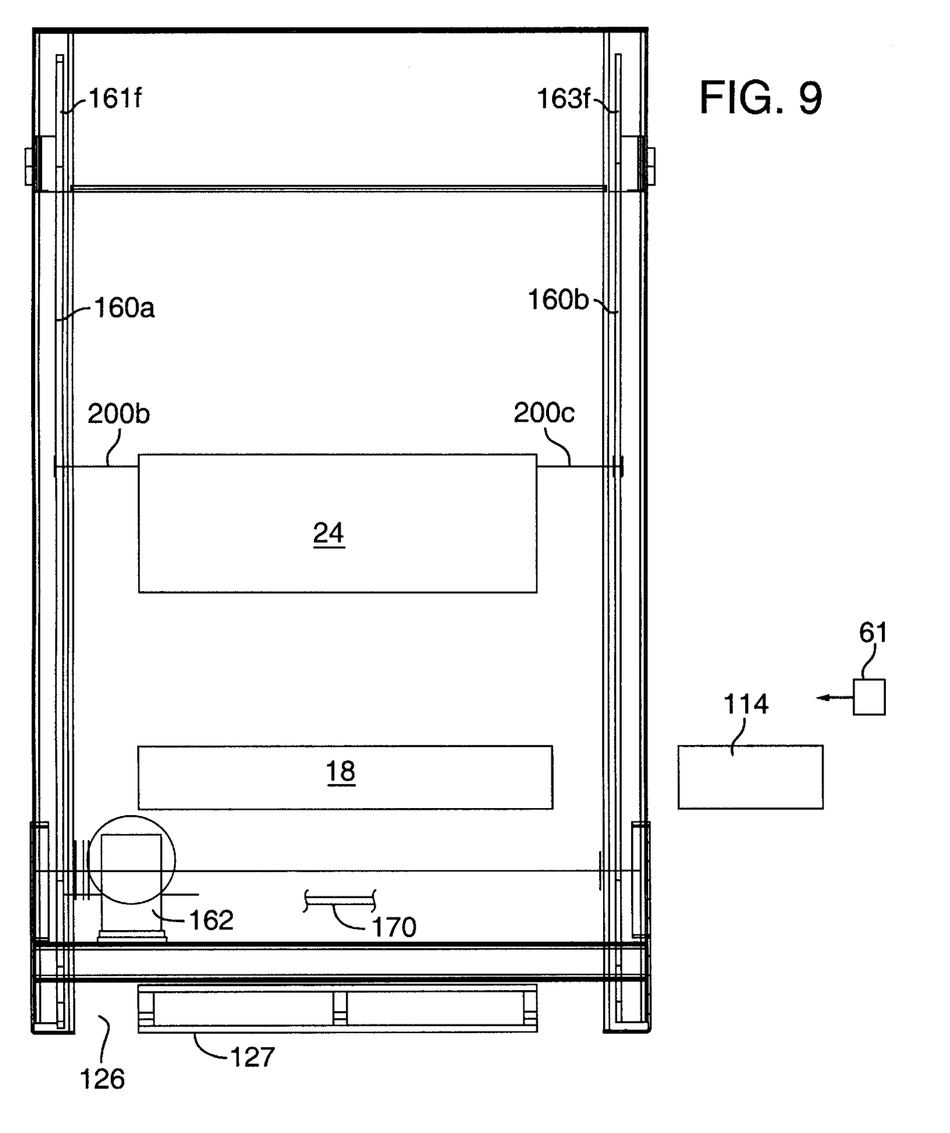
FIG. 9 is an end view of the palletizing system of FIG. 6 as taken along lines 9—9 of FIG. 8.

A pair of chain guides 156a and 156b each establish a "loop" guide path for a corresponding one of chains 160a and 160b, respectively, carried thereby. Chain guides 156a and 156b each include a series of idle sprockets 161 and 163, respectively. More particularly, chain guide 156a includes idle sprockets 161a–161h. Chain guide 156b includes idle sprockets 163a–163h. Idle sprockets 163a–163h, best viewed in FIG. 7, represent also the arrangement for idle sprockets 161a–161h with respect to support of chain 160a. While a specific configuration for chain guides 156 and for chains 160 are shown and illustrated, the present invention may be implemented by other geometric configurations including variation in chain guide path shape and number of chains employed.

While the use of chains and chain guides or pulleys has been shown, it will be understood that a variety of alternative mechanisms may be used such cables, cogged timing belts, and guide tracks establishing a fixed path of movement for a lift head. Accordingly, the terms "chains" and "chain guides" shall also refer to any such alternative mechanism.

Figure 10:
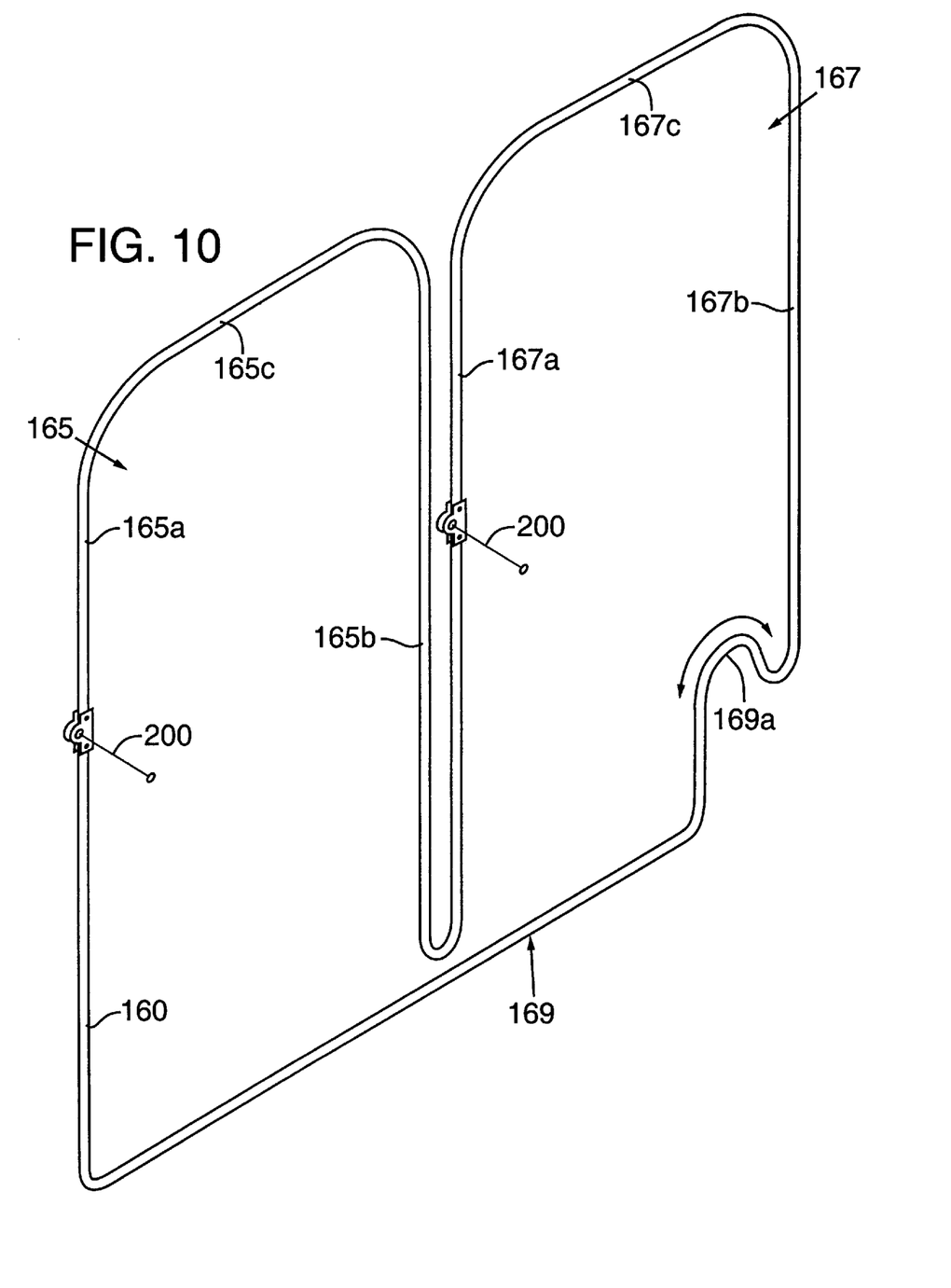
FIG. 10 illustrates a chain loop mountable within the palletizing system of FIG. 6.

FIG. 10 illustrates separately and in perspective one of chains 160. The illustrated shape of a chain 160 in FIG. 10 corresponds to that shape assumed when mounted on the corresponding guide 156 of system 110. Generally, each chain 160 follows a closed-circuit path as defined by the corresponding guide 156. The geometric configuration includes a leftward rectangular portion 165 and a rightward rectangular portion 167. Each of portions 165 and 167 include a most leftward vertical section 165a and 167a, respectively. Similarly, each rectangular portion 165 and 167 includes a most rightward vertical section 165b and 167b, respectively. Vertical sections 165a and 165b couple across an upper horizontal section 165c. Vertical sections 167a and 167b couple across a upper horizontal section 167c. Generally, sections 165a–165c form an inverted U-shape. Sections 167a–167c also form an inverted U-shape. Vertical sections 165b and 167a couple at idle sprocket 161d, in the case of chain 160a, and at idle sprocket 163d, in the case of chain 160b. Vertical sections 165a and 167b couple across a lower generally horizontal section 169 including a drive section 169a. Chains 160 carry lift head 24 via pins 200 and a reversible drive motor 162 couples to chains 160 at drive section 169a for movement of lift head 24 along a fixed path between sites 18' and 126. The reversible aspect drive motor 162 allows bi-directional movement of lift head 24 along the fixed path between sites 18' and 126. By appropriately engaging and disengaging item layers 60 with lift head 24 while moving lift head 24 between sites 18' and 126, system 110 palletizes pallet stacks.

In the particular configuration of guides 156 and chains 160 illustrated herein, each of chain guides 156 define a similar geometric pattern, i.e., a pair of generally rectangular, but rounded corner, sections 165 and 167. Chains 160a and 160b are in face-to-face relation. Drive motor 162 couples to a drive shaft 170. Drive shaft 170 carries drive sprockets 172a and 172b. Sprockets 172a and 172b engage chains 160a and 160b, respectively at drive sections 169a. Thus, drive shaft 170 drives and synchronizes chains 160a and 160b. The geometric pattern for each of the chain guides 156 is identical such that corresponding links or points including pins 200 on each of the chains 160 move in identical direction, i.e., along identical but offset paths.

Support pins 200a–200d couple lift head 24 to chains 160. More particularly, pins 200a and 200b couple lift head 24 to chain 160a and pins 200c and 200d couple lift head 24 to chain 160b. Pins 200 mounted to a given chain 160 occupy similar locations on rectangular portions 165 and 167, respectively. For example, pin 200a occupies vertical section 167a while pin 200b occupies vertical section 165a. Similarly, as pin 200a moves onto horizontal section 167c, pin 200b moves onto horizontal section 165c. In this manner, synchronized movement of chains 160 causes similar but offset movement of pins 200, and therefore movement of lift head 24 along a fixed path between sites 18' and 126. Pins 200 thereby provide vertical support for lift head 24 relative to chains 160, but must allow relative rotation therebetween. Thus, pins 200 may be fixed relative to either lift head 24 or to the corresponding one of chains 160, but must allow rotation relative to the other. During operation of motor 162 and synchronized movement of chains 160, lift head 24 assumes and maintains a horizontal orientation while moving along a fixed path between sites 18' and 126.

Upon activation of motor 162, pins 200 move in unison along the fixed path selectively between sites 18' and 126. From the particular position illustrated in FIGS. 1–4, pins 200 move from above site 126 vertically upward and eventually reach an upper position along guides 156 and then turn rightward along rounded portion of guides 156. Pins 200 then move in unison horizontally rightward. Eventually, pins 200 reach the rightward end of the upper horizontal portion of the corresponding guides 156 and move downward along a rightward vertical portion of the corresponding chain guide 156 over site 18'. Reversing drive motor 162 causes similar, but opposite, movement of pins 200 and lift head 24.

Thus, system 110 uses a single actuation mechanism operating in one dimension, i.e., bi-directional movement of lift head 24 along a fixed path, between sites 18' and 126. While additional chains or motors could be employed, e.g., a separate motor for each chain loop 160, synchronization in movement of the chains 160 and pins 200 establishes a unified or single actuation system 122. As a result, a simple control scheme including start, stop and directional control relative to motor 162 satisfies necessary movement of lift head 24 in palletizing operations.

Lift head 24 carries a detector 210 (shown schematically in FIG. 7) indicating a given vertical separation between lift head 24 and a support surface therebelow, i.e., a surface at which a given layer 60 is to be placed or a surface at which a given layer 60 rests prior to engagement by lift head 24. Because items may vary in vertical dimension, the distance between lift head 24 and an appropriate support surface therebelow, e.g., site 18' or the upper surface of a stack of layers 60 at site 126, varies. Thus, detector 210 can be a simple limit switch adjustable in vertical position upon head 24 to account for the particular vertical dimension of items to be palletized. As may be appreciated, however, detector 210 can be a more sophisticated, e.g., mechanical plunger or general purpose distance-reading, device providing data indicating actual separation between lift head 24 and a given placement or picking surface. Furthermore, an encoder may be employed to specify in linear fashion, i.e., provide a single scalar value for, the position of lift head 24. Because this is a one-dimensional actuation system, i.e., movement along a fixed path, a single scalar value indicates the location of lift head 24 along that fixed path. In the preferred embodiment of the present invention, detector 210 is an optical device detecting when lift head 24 has reached a given position relative to an appropriate support surface therebelow, i.e., a position appropriate for either engaging or releasing an item layer to be picked up or deposited, respectively, at support surface therebelow.

With chains 160 in appropriate synchronization as illustrated and with lift head 24 appropriately mounted thereupon via pins 200, activation of drive motor 162 in a first direction moves lift head 24 along the fixed path toward site 18' while operation of motor 162 in the opposite direction moves lift head 24 along the fixed path toward site 126.

Figure 11:
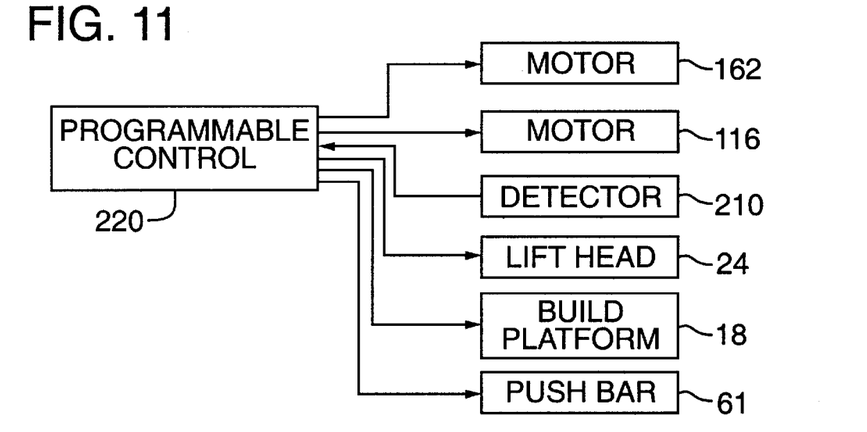
FIG. 11 illustrates by block diagram a control arrangement for the palletizing system of FIG. 6.

A programmable control 220 (FIG. 11) couples to the various components of system 110 to implement automated palletization. Programmable control 220 operates drive motor 162 to move lift head 24 in a selected direction along the fixed path coupling sites 18' and 126. Programmable control 220 also receives from detector 210 indication of the relative spacing between lift head 24 and a support surface therebelow, e.g., site 18' or the top layer 60 in a pallet stack at site 126. As lift head 24 approaches site 18' with an item layer 60 thereat, detector 210 eventually indicates to programmable control 220 suitable position in relation to site 18', and therefore the upper surface of the item layer 60 then present at site 18'. In response, programmable control 220 halts operation of drive motor 162. Programmable control 220 then activates lift head 24 and build platform 18 as described above to engage the layer 60 present at site 18'. Once engaged, programmable control 220 reverses operation of drive motor 162. Lift head 24 then moves upward along with the item layer 60 just taken from site 18', moves horizontally to a position over site 126, and then moves vertically downward toward site 126 until detector 210 indicates to programmable control 220 that the item layer 60 engaged by lift head 24 has reached a point just above a support level, i.e., just above a pallet if this is the first layer 60 placed or just above the top item layer 60 presently resting on a pallet at site 126. Programmable control 220 then instructs lift head 24 to release the item layer now resting at site 126. By receiving an appropriate sequence of layers 60 at site 18', system 210 thereby stacks such layers on a pallet at site 126.

The radius of the upper idle sprockets, i.e., sprockets 161*b*, 161*c*, 161*e*, 161*f*, 163*b*, 163*c*, 163*e*, and 163*f*, determines the continuity of transition between vertical and horizontal movement for lift head 24. By providing "oversized" radii for these idle sprockets, lift head 24 undergoes a smooth transition between vertical and horizontal movement. The greater the radii in these idle sprockets, the smoother the transition between vertical and horizontal movement for a given item layer carried by lift head 24.

Chain guide geometry should provide vertical movement of lift head 24 directly above site 18' and above site 126. The length of vertical movement above site 126 varies as a function of the height of a stack of layers allowed on a pallet. In other words, lift head 24 movement should be vertical just prior to layer placement or layer collection and the extent of vertical movement established by system 110 should accommodate overall vertical variation in pallet stack height allowed.

The overall size of palletizing system 110 is generally more compact than other palletizing and/or de-palletizing systems. The overall compact size of system 110 creates a more desirable shipping configuration for system 110 and thereby reduces cost of delivery to a remote site. The vertical height of system 110 corresponds generally to the maximum allowed height for a stack of item layers on a pallet 127 plus an allowance for the upper curved portion, i.e., rounded corners, of the fixed path. As discussed above, an exaggerated or increased radius path in transition between vertical and horizontal movement smoothes the transition and decreases the likelihood of a loss of item layer engagement.

Furthermore, because system 110 defines a generally box-form structure incorporation of additional safety barriers, e.g., clear plastic walls (not shown), comes at small marginal cost relative to incorporation of such safety features in conventional palletizing and/or de-palletizing equipment. More particularly, system 110 may be made less hazardous to workers by mounting wall structures to frame 220. In conventional palletizing and/or de-palletizing systems, no such frame structure exists and incorporating such safety walls comes a relatively greater marginal expense.

Figure 12:
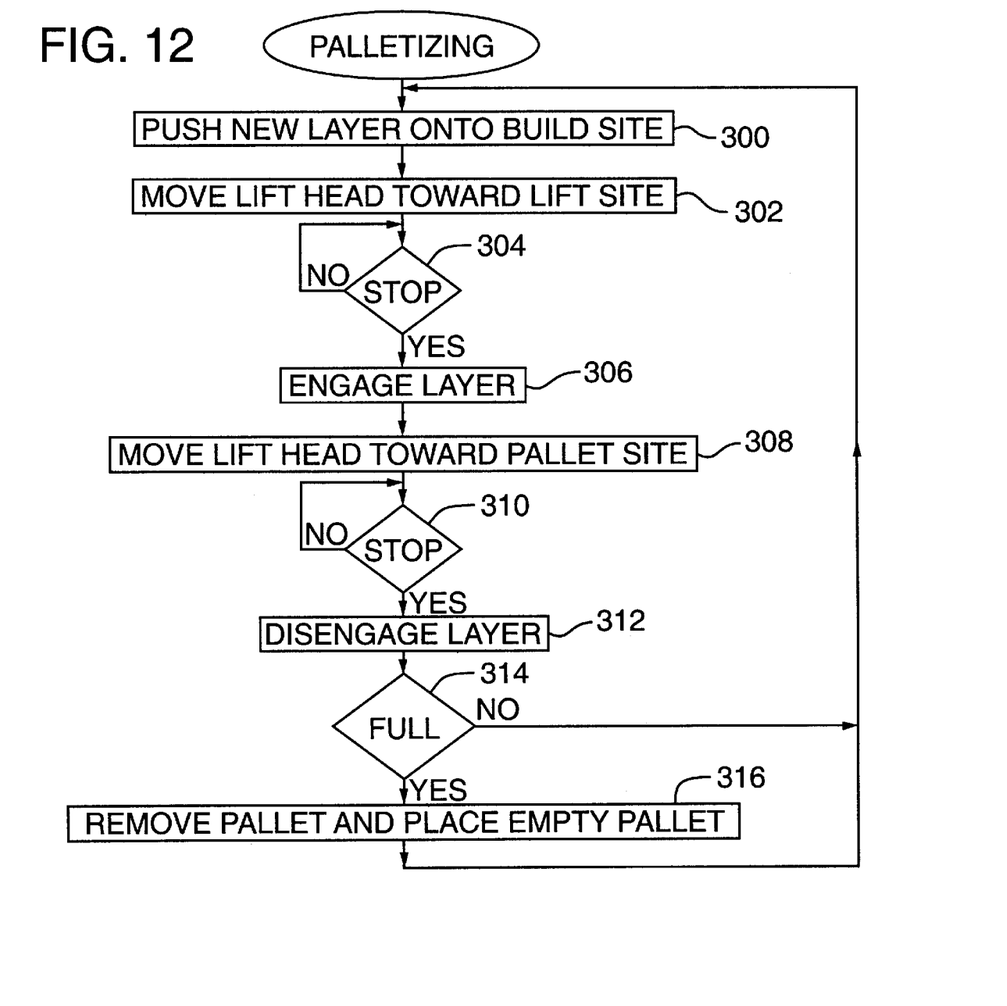
FIG. 12 illustrates by flow chart a palletizing operation performed by the system of FIG. 6.

FIG. 12 illustrates by flow chart a control scheme used during a palletizing operation. In FIG. 12, processing begins in block 300 where programmable control 220 operates transport system 112, i.e., transport 114 and push bar 61, to move a new item layer 60 onto site 18'. In block 302, programmable control 220 moves lift head 24 toward site 18'. As may be appreciated, the operation of block 302 can be conducted concurrently with the operation of block 300, but leaving lift head 24 sufficiently above stationary site 18' to allow placement of the new item layer at site 18'. Processing loops at decision block 304 until lift head 24 has been moved to an appropriate position relative to site 18' to engage the item layer now resting at site 18'. In other words, lift head 24 moves downward until detector 210 indicates to programmable control 220 that downward movement may stop. In block 306, lift head 24 engages the item layer at site 18' as described above. More particularly, programmable control 220 first operates drive motor 34 until the trailing roller tube 32a reaches the edge of pallet layer 60 most distant from stop plate 58. Once so positioned, programmable control 220 operates drive motor 52 to advance the leading roller tube 46a into position just behind the trailing roller tube 32a. Drive motors 34 and 52 are then operated concurrently to pass support for the item layer 60 from build platform 18 to lift head 24 as described above and illustrated in FIGS. 3A–3D.

In block 308, programmable control 220 moves lift head 24 and the item layer 60 carried thereby toward pallet site 126 along the fixed path as described herein. In other words, programmable control 220 activates in reverse direction drive motor 162 and lift head 24 moves upward, horizontally rightward as viewed in FIG. 6, and downward toward site 126. Processing loops at decision block 310 until detector 210 indicates to programmable control 220 that lift head 24 has achieved an appropriate position for releasing the item layer 60, i.e., has brought the item layer 60 to a position just above a pallet 127 at site 126 or just above the top layer 60 of a stack of layers 60 on a pallet 127 at site 126. In block 312, programmable control 320 instructs lift head 24 to release the layer. More particularly, programmable control 220 activates drive motor 52 to move roller tubes 46, presently supporting the item layer 60, toward stop plate 58. Eventually, roller tubes 46 move out from under layer 60 and layer 60 drops to the support surface therebelow, i.e., drops onto a pallet at site 126 or onto the top layer 60 of a stack of item layers 60 on a pallet at site 126. Lift head 24 then returns in a direction toward site 18'. Also, while lift head 24 is moving a given layer 60 toward site 126, programmable control 220 can move a next item layer 60 on to site 18'.

In block 314, programmable control 220 determines whether the pallet presently at site 126 is full. For example, if an encoder device is used to detect the position of lift head 24 then the height of a stack of layers 60 on a pallet at site 126 may be inferred from chain position. Other pallet stack height detection devices may be used to indicate to programmable control 220 when a given pallet is full. If the pallet is not full, then processing returns from decision block 314 directly to block 300. Otherwise, processing passes through block 316 where pallet carrier 128 removes the fall pallet 127 from site 126 and places an empty pallet 127 at site 126. As may be appreciated, pallet carrier 128 could be an automated device operating under the direction of programmable control 220 or be a forklift 128 operated in conjunction with system 110 operation.

While a variety of chain shapes and number of chains and support arrangements establishing guide paths may be established, generally pins 200 should move in similar but offset paths to establish a fixed path of movement for lift head 24 between sites 18' and 126. Accordingly, it will be appreciated that the present invention is not limited to a particular number of chains or particular chain geometry.

Despite an extremely simple control mechanism, i.e., a one dimensional fixed path bi-directional motor control, pallet layers 60 enjoy a smooth transition from build platform 18 to lift head 24 and enjoy a smooth ride in transition between sites 18' and 126. Achieving such smooth transitions in an x-y positioning system, e.g., overhead crane and lift apparatus, requires relatively complex coordination between x movement and y movement.

It will be appreciated that the present invention is not restricted to the particular embodiment that has been described and illustrated, and that variations may be made therein without departing from the scope of the invention as found in the appended claims and equivalents thereof.

What is claimed is:

1. A pick and place device moving a layer of items from a pick site to a place site, the device comprising:
   a pick site receiving said item layer at a support platform thereof, said support platform including a moveable first apron;
   a place site;
   a lift head moveable between said pick site and said place site, said lift head including a second apron, said second apron being moveable and flexible relative to at least one dimension thereof, said second apron being moveable between a first position and a second position, in said first position said second apron being located to close a downward-facing opening of said lift head, in said second position said second apron being located to open said downward-facing opening of said lift head; and
   a control operative to selectively move said lift head between said pick site and said place site, said control moving said second apron to said second position and thereafter moving said lift head and bringing at least a portion of said first apron in substantially co-planar relation with at least a portion of said second apron, said control being further operative to move said first apron and to concurrently move said second apron into said first position to pass support of said item layer at said support platform from said first apron to said second apron.

2. A device according to claim 1 wherein said control further operates to move said lift head to said place site and thereafter move said second apron out from under said layer whereby said layer drops through said downward-facing opening and onto said place site.

3. A device according to claim 1 wherein said first apron is moveable and flexible relative to at least one dimension thereof.

4. A device according to claim 3 wherein said first apron comprises a plurality of elongate elements maintained generally in parallel relation and moveable laterally in unison.

5. A device according to claim 1 wherein said second apron comprises a plurality of elongate elements maintained generally in parallel relation and moveable laterally in unison.

6. A device according to claim 1 wherein said first apron is moveable and flexible relative to at least one dimension thereof and wherein said first apron comprises a first plurality of elongate elements maintained generally in parallel relation and moveable laterally in unison and wherein said second apron comprises a second plurality of elongate elements maintained generally in parallel relation and moveable laterally in unison.

7. A device according to claim 6 wherein said first plurality of elongate elements comprise roller tubes.

8. A device according to claim 6 wherein second plurality of elongate elements comprise roller tubes.

9. A device according to claim 6 wherein said first and second plurality of elongate elements comprise roller tubes.

10. A device according to claim 6 wherein said pick site comprises a pair of chain loops operable in unison and wherein corresponding links of said chain loops interconnect via said first plurality of elongate elements.

11. A device according to claim 6 wherein said lift head comprises a pair of chain loops operable in unison with corresponding links thereof interconnected via said second plurality of elongate elements.

12. A device according to claim 6 wherein said control further operates to move said lift head to said place site and thereafter move said second plurality of elongate elements laterally out from under said layer whereby said layer drops through said downward-facing opening upon a drop site therebelow.

13. A lift head for moving an item layer from a pick site to a place site, said lift head comprising:

a structure defining a downward-facing opening and a lateral-facing opening;

an apron, said apron being flexible and moveable in at least one dimension thereof, said apron having a first position closing said downward-facing opening, said laterally-facing opening being open at least when said downward-facing opening is closed by said apron;

a stop element, said stop element being fixed relative to said lift head; and a control operative to move said apron to said first position, move said item layer upon said apron by passage through said laterally-facing opening, move said lift head from said pick site to said place site, and move said apron out of said first position to urge said layer against said stop element and further to open said downward-facing opening whereby said lift head drops said layer from said apron through said downward-facing opening.

14. A lift head according to claim 13 wherein said apron comprises plurality of elongate elements moveable laterally in unison.

15. A lift head according to claim 14 wherein said plurality of elongate elements comprise roller tubes.

16. A lift head according to claim 14 wherein said lift head comprises a pair of chain loops with corresponding links thereof coupled via said plurality of elongate elements.

17. A lift head for moving an item layer from a pick site to a place site, said lift head comprising:

a structure defining a downward-facing opening and a lateral-facing opening;

an apron, said apron being flexible and moveable in at least one dimension thereof, said apron having a first position closing said downward-facing opening, said laterally-facing opening being open at least when said downward-facing opening is closed by said apron, said apron being moveable about a path surrounding an item layer carried thereby;

a stop element; and a control operative to move said apron to said first position, move said item layer upon said apron by passage through said laterally-facing opening, move said lift head from said pick site to said place site, and move said apron out of said first position to urge said layer against said stop element and further to open said downward-facing opening whereby said lift head drops said layer from said apron through said downward-facing opening.

18. A lift head according to claim 17 wherein said apron comprises plurality of elongate elements moveable laterally in unison.

19. A lift head according to claim 18 wherein said plurality of elongate elements comprise roller tubes.

20. A lift head according to claim 18 wherein said lift head comprises a pair of chain loops with corresponding links thereof coupled via said plurality of elongate elements.

21. A lift head for moving an item layer from a pick site to a place site, said lift head comprising:

a structure defining a downward-facing opening and a lateral-facing opening;

an apron, said apron being flexible and moveable in at least one dimension thereof, said apron having a first position closing said downward-facing opening, said laterally-facing opening being open at least when said downward-facing opening is closed by said apron;

a stop element; and a control operative to move said apron to said first position, move said item layer upon said apron by passage through said laterally-facing opening, move said lift head from said pick site to said place site, and move said apron out of said first position to urge said layer against said stop element and further to open said downward-facing opening whereby said lift head drops said layer from said apron through said downward-facing opening, said control moving said lift head along a guide constraining said lift head to a fixed curvilinear path wherein said lift head couples to corresponding points of similarly shaped segments of said path, said segments being offset in a direction from said from said pick site to said place site.

22. A lift head according to claim 21 wherein said apron comprises plurality of elongate elements moveable laterally in unison.

23. A lift head according to claim 22 wherein said plurality of elongate elements comprise roller tubes.

24. A lift head according to claim 22 wherein said lift head comprises a pair of chain loops with corresponding links thereof coupled via said plurality of elongate elements.

* * * * *